(12) United States Patent
Schilling et al.

(10) Patent No.: US 10,843,450 B2
(45) Date of Patent: Nov. 24, 2020

(54) METHOD, APPARATUS, AND CONTROL UNIT FOR PRODUCING A THREE-DIMENSIONAL OBJECT

(71) Applicant: EOS GmbH Electro Optical Systems, Krailling (DE)

(72) Inventors: Alexander Schilling, Munich (DE); Georg Fey, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 95 days.

(21) Appl. No.: 15/508,380

(22) PCT Filed: Aug. 14, 2015

(86) PCT No.: PCT/EP2015/068795
§ 371 (c)(1),
(2) Date: Mar. 2, 2017

(87) PCT Pub. No.: WO2016/034393
PCT Pub. Date: Mar. 10, 2016

(65) Prior Publication Data
US 2017/0282463 A1  Oct. 5, 2017

(30) Foreign Application Priority Data

Sep. 5, 2014  (DE) .......................... 10 2014 217 786

(51) Int. Cl.
*B29C 64/35* (2017.01)
*B33Y 10/00* (2015.01)
(Continued)

(52) U.S. Cl.
CPC ............ *B33Y 10/00* (2014.12); *B08B 15/007* (2013.01); *B29C 64/153* (2017.08); *B29C 64/35* (2017.08);
(Continued)

(58) Field of Classification Search
CPC .............. B22F 3/105; B22F 2003/1056; B22F 3/1055; B23K 26/142; B29C 64/153;
(Continued)

(56) References Cited

U.S. PATENT DOCUMENTS 6,215,093 B1   4/2001  Meiners et al.
6,583,379 B1   6/2003  Meiners et al.
(Continued)

FOREIGN PATENT DOCUMENTS

CN    102574333    7/2012
DE    19649865 C1  12/1996
(Continued)

OTHER PUBLICATIONS

International Preliminary Report on Patentability dated Mar. 16, 2017, 13 pages.

*Primary Examiner* — Jacob T Minskey
*Assistant Examiner* — Cedrick S Williams
(74) *Attorney, Agent, or Firm* — Seyfarth Shaw LLP

(57) ABSTRACT

A method for controlling the direction of gas suctioning is carried out in a device (1) for producing a three-dimensional object (2) by selectively solidifying building material (13) layer by layer. The device (1) comprises an application device (12-14) for applying a layer of the building material (13) to a build area in a working plane (10), a solidifying device (20) for selectively solidifying the building material (13) in the applied layer, and at least two gas nozzles (40) which are arranged at the edge of the build area. The gas nozzles (40) are switchable into a function for suctioning gas from the device (1) and to a functionless state, and are switched depending on an operating state of the device (1).

14 Claims, 5 Drawing Sheets

(51) Int. Cl.
*B08B 15/00* (2006.01)
*B29C 64/153* (2017.01)
*B29C 64/371* (2017.01)
*B33Y 30/00* (2015.01)
*B33Y 50/02* (2015.01)

(52) U.S. Cl.
CPC ............ *B29C 64/371* (2017.08); *B33Y 30/00* (2014.12); *B33Y 50/02* (2014.12); *B08B 2215/003* (2013.01)

(58) Field of Classification Search
CPC ......... B29C 64/20; B29C 64/10; B29C 64/35; B29C 64/371; B29C 64/393; B33Y 40/10; B33Y 10/00
See application file for complete search history.

(56) References Cited

U.S. PATENT DOCUMENTS

| | | |
|---|---|---|
| 2007/0026145 A1 | 2/2007 | Lindemann et al. |
| 2012/0251378 A1 | 10/2012 | Abe et al. |
| 2016/0114531 A1* | 4/2016 | Chuang .................. B29C 64/20 264/497 |
| 2016/0136731 A1* | 5/2016 | McMurtry ............ B22F 3/1055 419/53 |
| 2017/0136696 A1* | 5/2017 | Jakimov ............... B22F 3/1055 |
| 2018/0185961 A1* | 7/2018 | Meidani ................. B33Y 10/00 |

FOREIGN PATENT DOCUMENTS

| | | | |
|---|---|---|---|
| DE | 19853947 | C1 | 2/2000 |
| DE | 102004031881 | A1 | 1/2006 |
| DE | 102006014835 | A1 | 10/2007 |
| DE | 102014212100 | A1 * | 12/2015 |
| EP | 2492084 | A1 | 8/2012 |
| WO | 1992008592 | A1 | 5/1992 |
| WO | 2005025780 | A1 | 3/2005 |
| WO | 2014125281 | A2 | 8/2014 |

* cited by examiner

METHOD, APPARATUS, AND CONTROL UNIT FOR PRODUCING A THREE-DIMENSIONAL OBJECT

TECHNICAL FIELD OF THE INVENTION

The present invention relates to a method and an apparatus for producing a three-dimensional object by selectively solidifying building material layer by layer by supplying energy, and to a control unit for such a device. In particular, the present invention relates to a method for controlling the direction of a gas suctioning in such a device.

BACKGROUND OF THE INVENTION

A method of such kind is used for rapid prototyping, rapid tooling or rapid manufacturing, for example. One example of such a method is known by the name "selective laser sintering or laser melting". In that method, powder is solidified selectively by irradiating it selectively with a laser beam.

However, when a material is irradiated with a laser beam, sputters, smoke, residues, fumes and/or gases are generated and spread into the process chamber depending on the type of material used but particularly when sintering or melting metal powder. This can interfere with the production process, for example by interfering with the propagation of the laser beam, settling on the laser beam coupling window or becoming deposited on or in the powder surface facing the laser beam and forming troublesome inclusions during the solidification of subsequent object regions, thereby impairing the quality of the finished object or adversely affecting the application of the subsequent layer. In order to remove such contaminants from the process chamber, in DE 198 53 947 C1 an apparatus is suggested in which a directed flow of protective gas is passed through the process chamber.

Modern laser sintering devices have relatively large build areas, to which the powder layer is applied for solidification, in the order of magnitude of 400×400 mm for example. With build areas of this size, it is possible that larger, heavier particles may not be completely carried over the entire build area by a gas stream, but may settle on the surface of the powder layer as they are being transported through the process chamber. Such particles continue to form interfering inclusions when a subsequent layer of powder is applied and solidified, and these impair the quality of the finished object.

Moreover, it may happen that particles of the type described above for example are also deposited in other regions of the interior of laser sintering devices, and over time these contaminants may adversely affect the operation of the laser device. Such residues accumulate on the aforementioned coupling window, for example.

SUMMARY OF THE INVENTION

The object of the present invention is therefore to provide an improved method and an improved device for producing a three-dimensional object. In this context, it is particularly intended that the effect of the extraction of interfering particles will be improved. Such improvement may for example consist in that larger, heavier particles that are formed while the building material is being solidified can be suctioned away reliably, so that the quality of the finished object may be improved and/or the operation of the apparatus may be simplified. A further improvement may consist in that a more effective suction effect of interfering particles is achieved even on large build areas and/or on areas in the interior of the apparatus that are farther from a build area.

The object is solved with a method according to claim 1 or 6 and with an apparatus according to claim 12. On this basis, the object is also solved with a computer program according to claim 8, a control unit according to claim 9 or a retrofit kit (possibly for use when retrofitting existing equipment) according to claim 11. Refinements of the invention are described in the respective subordinate claims. In these, the respected methods may each be developed further both by each other and by the subordinate features or the features described in the subordinate claims, or vice versa. Moreover, the inventive device may also be developed with a control unit according to the invention or a retrofit kit according to the invention.

The method according to the invention for controlling the direction of gas suctioning is carried out in an apparatus for producing a three-dimensional object by selectively solidifying building material layer by layer. The device comprises an application device for applying a layer of the building material to a build area in a working plane, a solidifying device for selectively solidifying the building material in the applied layer, and at least two gas nozzles which are arranged at the edge of the build area. The gas nozzles may be switched to a function for suctioning gas from the device and to a functionless state, and are switched depending on an operating state of the device. With this method, it is possible to control the direction of gas suctioning in the device so as to obtain the most favorable effect for the respective operating state.

The gas nozzles are preferably switched according to a current solidification site, that is to say the operating state of the apparatus is determined (at least as one of the factors) by the position of the current solidification site. Accordingly, among other things the direction of gas suctioning may be controlled depending on the site where the impurities to be removed by the gas stream are formed.

It is preferably a gas nozzle that is closer to the current solidification site than another gas nozzle, more preferably the gas nozzle that is closest to the current solidification site which is switched to the function for suctioning gas. This ensures for example that the impurities only have to be transported for the shortest possible distance, so that even heavier particles can be suctioned reliably.

The build area is preferably divided into predetermined areas, and the gas nozzles are switched depending on which of these areas the current solidification point is located. Thus, for example it may be determined in advance which gas nozzle is to be used as the suction nozzle for the various positions.

The gas nozzles are preferably also switchable to a function for supplying gas to the apparatus, and at least one of the gas nozzles, which is/are different from the one or more gas nozzles that are switched to the function for suctioning gas, is/are switched to the function for supplying gas. This means that this/these at least one gas nozzle(s) may be switched between a function as a suction nozzle and a function as a gas supply nozzle (so called "feed nozzle"). Temporally between these two switching states is the switching state in which the respective gas nozzle at least very briefly is switched in the functionless state. Among other options, this also makes it possible to control the direction of gas feed into the device to obtain the most favorable effect for the respective operating state.

The inventive method for producing a three-dimensional object by application and selective solidification of a building material one layer at a time includes the steps of applying a layer of building material to a build area in a working plane, selectively solidifying the layer of the building material at sites in the respective layer that correspond to a cross-section of the object that is to be produced, and repeating these two steps until the object is completed. At the same time, while the object is being produced a gas is sucked through at least one of two gas nozzles arranged on the edge of the build area, and the direction of gas suctioning is controlled as described above. In this way, impurities, for example are reliably suctioned away without disturbing the structure of the object, thereby enabling the quality of the finished product to be improved.

A current solidification point site is preferably controlled depending on a switching state of the gas nozzles. In this way it is possible to avoid the gas nozzles having to switch too frequently for example, and so to shorten the time required to produce an object.

The gas nozzles are preferably switched during the selective solidification of a layer. This makes it possible to change the direction of gas suctioning during the selective solidification of a layer.

The computer program according to the invention may be loaded into a programmable control unit which is contained in the apparatus described above for producing a three-dimensional object, and includes program code means that enable it to perform all the steps of one of the methods described above when it is executed on the control unit. This enables the gas nozzles to be controlled flexibly by computer software.

The control unit according to the invention for a device as described above is designed to switch the gas nozzles depending on an operating state of the device. This makes it possible for the control unit of the apparatus to carry out the method according to the invention for controlling the direction of a gas suctioning operation.

The control unit is preferably also designed to control or regulate the solidifying device for defining the solidification site. In this way, the switching of the gas nozzles is controlled by the same unit as the setting of the solidification site, which enables both to be synchronized with each other more easily among other benefits.

The retrofit kit according to the invention for a device as described above includes at least two gas nozzles and a control unit as described above. With this retrofit, existing systems can be upgraded in such manner that they are able to carry out the inventive method for controlling the direction of a gas suctioning operation.

The inventive device for producing a three-dimensional object by selectively solidification of building material one layer at a time comprises an application device for applying a layer of the building material to a build area in a working plane, a solidifying means for selectively solidifying the building material in the applied layer, and at least two gas nozzles arranged on the edge of the build area. The gas nozzles are switchable into a function for suctioning gas from the device and into a functionless state. The apparatus is designed to switch the gas nozzles depending on an operating state of the device. In this way, the apparatus as designed so that it is able to carry out the method according to the invention for controlling the direction of a gas suctioning operation.

The gas nozzles are preferably also switchable into a function for supplying gas to the apparatus. In this way, the apparatus is designed such that the direction of gas supply can also be controlled as is most favorable for the respective operating state.

The build area preferably has a rectangular shape in the working plane, and two gas nozzles are provided which are arranged on two opposite sides of the rectangle, or four gas nozzles are provided, each of which is disposed on a side of the rectangle. In this way it is possible to enable flexible adjustment of the gas flow direction with just a small number of switchable nozzles for a usual shape of the build area, for example.

The gas nozzles are preferably each designed and/or can be actuated in such manner that a velocity of a gas stream flowing through them is lowest at the level of the working plane. In this way, it may be ensured for example that no powder on the powder surface is blown away or sucked off, and/or also that contaminants above the powder surface can be suctioned off reliably.

Further features and practicalities of the invention will be apparent from the description of exemplary embodiments with reference to the accompanying drawings.

DETAILED DESCRIPTION OF THE EMBODIMENTS

Figure 1:
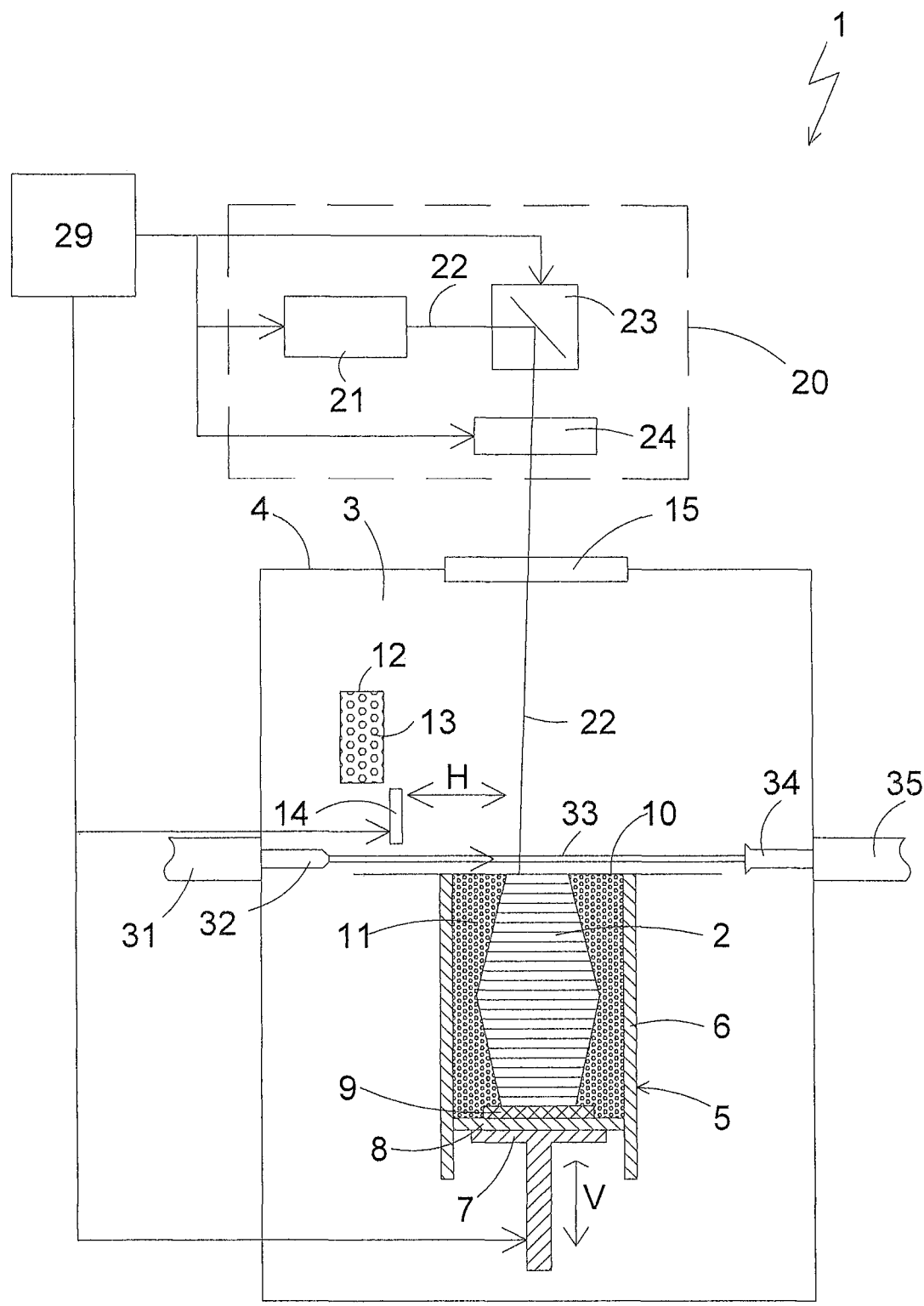
FIG. 1 is a schematic view in partial cross section of an embodiment of an apparatus for producing a three dimensional object layer by layer which is suitable for carrying out the present invention.

In the following, an apparatus 1 according to an embodiment of the present invention will be described with reference to FIG. 1. The device shown in FIG. 1 is a laser sintering or laser melting apparatus 1. In order to build an object 2, it contains a process chamber 3 with a chamber wall 4.

An upwardly open container 5 with a wall 6 is arranged in process chamber 3. A carrier 7 which is displaceable in a vertical direction V is arranged inside container 5, and a base plate 8 is mounted thereon which closes container 5 downwardly and so forms the bottom thereof. Base plate 8 may be a plate constructed separately from carrier 7 plate and fastened to carrier 7, or it may be constructed integrally with carrier 7. Depending on the powder and process used, still another construction platform 9, on which object 2 is constructed, may be mounted on base plate 8. However, object 2 may also be constructed on base plate 8 itself, which then serves as the construction platform. FIG. 1 shows the object 2 that is to be formed on construction platform 9 in container 5 below a working plane 10 in an intermediate state with multiple solidified layers surrounded by building material 11 that remains unsolidified.

Laser sintering device 1 further includes a storage container 12 for a powdery building material 13 that may be solidified by electromagnetic irradiation and a recoater 14 which is movable in a horizontal direction H for applying building material 13 to working plane 10. On the upper side thereof, wall 4 of process chamber 3 includes a coupling window 15 for the beam 22 that serves to solidify powder 13.

Laser sintering apparatus 1 further includes an irradiation device 20 with a laser 21 which generates a laser beam 22, which is deflected by a deflection device 23 and is focused through a focusing device 24 via coupling window 15 onto working plane 10.

Laser sintering apparatus 1 further includes a control unit 29, via which the individual components of device 1 are controlled in a coordinated way for carrying out the construction process. The control unit may include a CPU whose operation is controlled by a computer program (software). The computer program may be stored separately from the device, on a storage medium from which it may be loaded into the device, particularly into the control unit.

In order to create a (preferably laminar) gas flow 33 in process chamber 3, laser sintering device 1 further includes a gas feed duct 31, a gas inlet nozzle 32, a gas extraction nozzle 34 and a gas discharge duct 35. The gas supply and extraction may also be controlled by control unit 29. The gas that is suctioned out of process chamber 3 may be delivered to a filtering device (not shown), and the filtered gas may be returned to process chamber 3 through gas feed duct 31, thereby creating a recirculation system with a closed gas circuit. Instead of only one gas inlet nozzle 32 and one gas extraction nozzle 34, multiple nozzles may be provided in each case.

During operation, in order to apply a powder layer, carrier 7 is first lowered by a height that corresponds to the desired layer thickness. A layer of the powdery building material 13 is then applied with the aid of recoater 14. The application takes place over at least the entire cross section of object 2 that is to be produced, preferably over the entire build area, that is to say the area of working plane 10 that lies within the upper opening of container 5. Then, the cross section of object 2 to be produced is scanned by laser beam 22, so that the powdery building material 13 is solidified at the points corresponding to the cross section of the object 2 that is to be produced. These steps are repeated until object 2 is completed and can be removed from the construction space.

During the construction of object 2, a gas, preferably an inert gas such as argon and/or nitrogen, is introduced through gas inlet nozzle 32 into the process chamber and sucked out of the chamber again through gas extraction duct 34.

Figure 2:
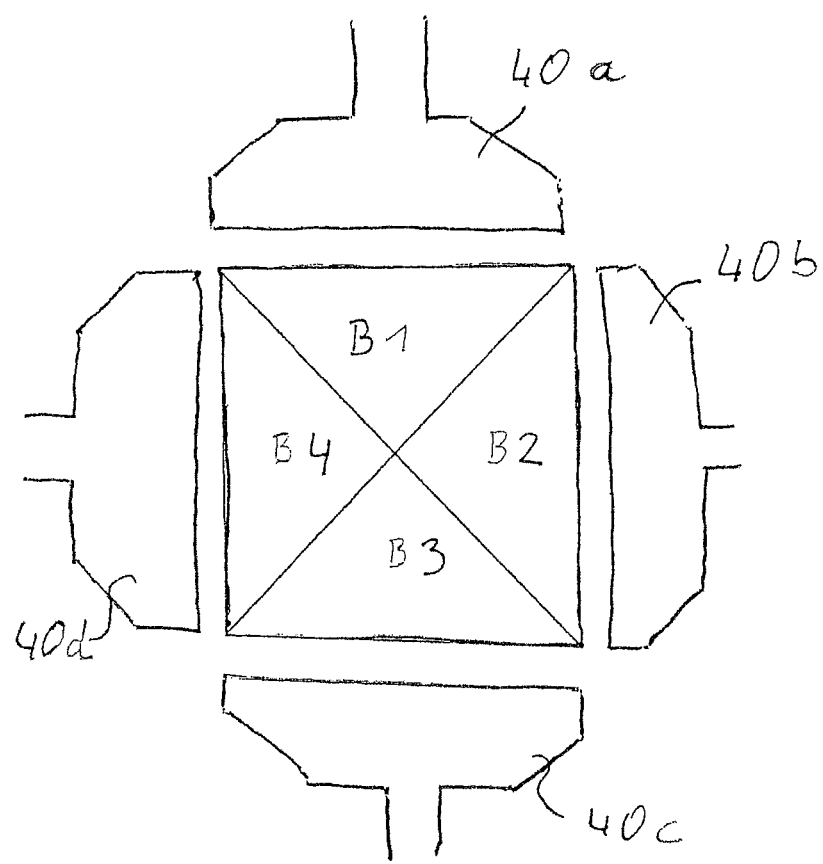
FIG. 2 is a schematic plan view of an embodiment of a build area with gas nozzles arranged all around it, and which is suitable for carrying out the present invention.

FIG. 2 shows a schematic plan view of an exemplary embodiment of a build area with gas nozzles arranged all around it, which is suitable for performing the present invention. In this embodiment, the build area is approximately square, and a gas nozzle 40 is disposed on each edge of the square, that is to say a total of four gas nozzles 40a-40d that are designed such that they may function both as gas inlet nozzles and as extraction nozzles. Each gas nozzle 40 has a width in a direction parallel to the respective side of the square build area that extends approximately over the entire width or length of the build area. Each gas nozzle 40 has one or more (not shown in the plan view) opening(s) on the side facing the respective edge of the square, through which the gas may flow out of the nozzle or may be sucked into it.

Whether a gas nozzle 40 is operated as a gas inlet nozzle or as a gas extraction nozzle or is inactive, is determined depending on the position of the current solidification site in the build area. In this context, the position in working plane 10 that is currently undergoing the solidification process, that is to say the site where the laser beam is currently incident on the powder, heating and solidifying it, is designated as the current solidification site. Thus, the current solidification point is also precisely the site where sputters, smoke, residues, fumes and/or gases are generated.

The operation of gas nozzles 40 as gas inlet nozzles or as gas extraction nozzles is preferably controlled in such manner that a distance between the solidification site and the gas extraction nozzle is as small as possible, that is to say suctioning is carried out as close as possible to the solidification site. For this purpose, for example, a gas nozzle (40) which is closer to the current solidification site than another gas nozzle, preferably gas nozzle (40), which is the closest to the current solidification site is switched to the function for suctioning gas. This control may be carried out for example by control unit 29, which controls irradiation unit 20 and thus defines the current solidification site.

The switching of gas nozzles 40 as gas inlet nozzles or as gas extraction nozzles, that is to say their connection to gas feed duct 31 or gas extraction duct 35, may be carried out by pneumatic pinch valves or non-return valves. However, individual gas nozzles 40 may also be inactive, i.e. not connected to either gas feed duct 31 or gas extraction duct 35.

The gas is supplied and extracted with such an intensity that an optimum suction effect is generated at the build area. Such an optimum is achieved when as many as possible, substantially all interfering particles are suctioned away by the extraction nozzle and at the same time no interference effects, caused for example by gas turbulence, are created on the powder surface.

In a first variant, as shown in FIG. 2 the square build area is divided into four triangular areas B1-B4 by its two diagonals, each of which extends from one edge of the square to the center thereof. The gas supply and gas suctioning is controlled depending on which of these areas the solidification site is currently located in.

Figure 3:
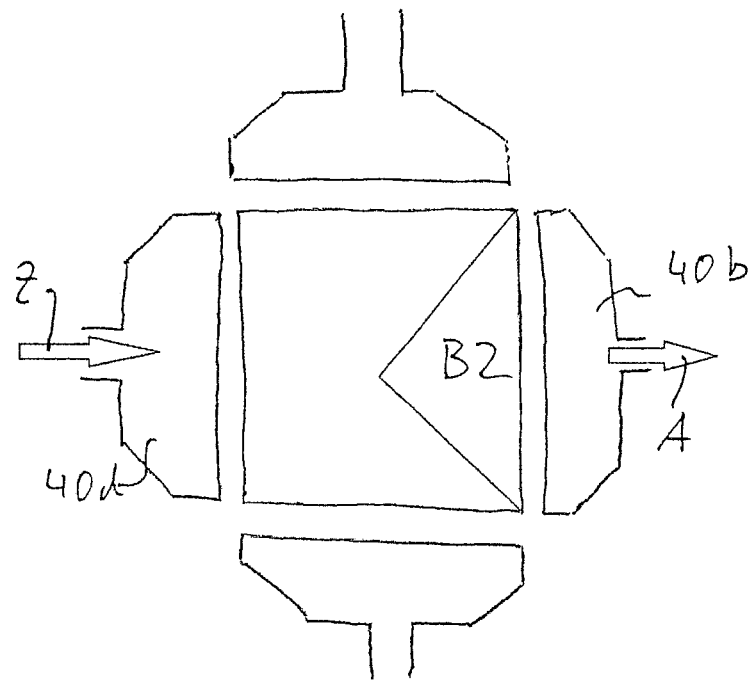
FIGS. 3 and 4 are schematic plan views of the build area shown in FIG. 2, which serve to illustrate a first variant of the inventive method.

As an example, FIG. 3 shows a case in which the current solidification site is located in triangular area B2, which (in the figure) adjoins the right edge of the build area. In this case, the gas nozzle 40 that is closest to the solidification site is gas nozzle 40b. Accordingly, in this case the gas is supplied (arrow Z) through gas nozzle 40d, and the gas is extracted (arrow A) through gas nozzle 40b.

Figure 4:
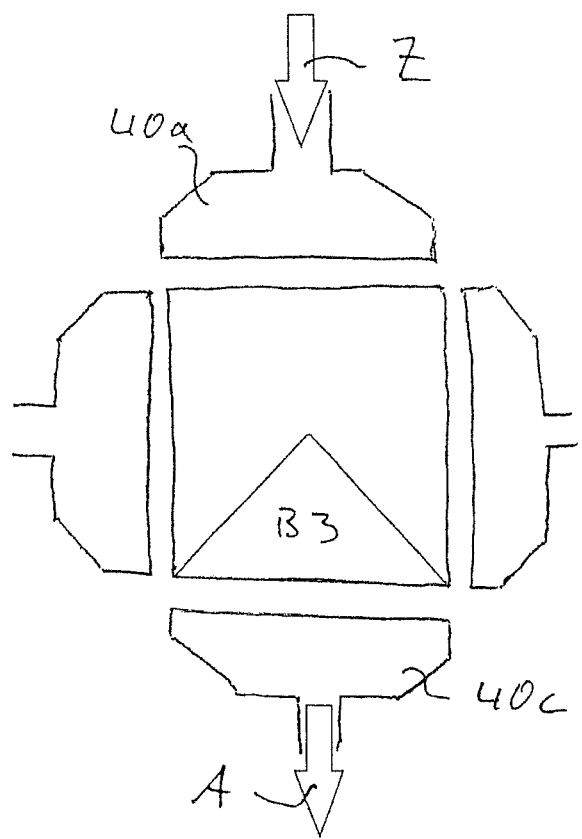

As another example, FIG. 4 shows a case where the current solidification point is located in triangular area B3, which (in the figure) adjoins the bottom edge of the build area. In this case, the gas nozzle 40 that is closest to the solidification site is gas nozzle 40c. Therefore, in this case, the gas is supplied (arrow Z) through gas nozzle 40a and the gas is extracted (arrow A) through gas nozzle 40c.

A similar procedure is carried out when the current solidification site is located in triangular area B1 or B4, wherein the respective gas flow directions are reversed with respect to the two cases described above.

Compared with a gas stream that runs in a constant direction through the entire process chamber, the effect of the change in gas flow direction brought about by this switching is that the sputters, smoke, residues, fumes and/or gases never have to travel more than half the length of the process chamber. Thus, switching the gas flow direction means that even larger, heavier particles, which would otherwise settle on the powder layer while being transported through the process chamber are effectively discharged from the process chamber. In order to be able to transport such particles away with a gas stream that passes through the entire process chamber, the flow rate and/or velocity of the gas stream would have to be increased, and this might disturb the surface of the applied layer of powder. By switching the gas flow direction depending on the current solidification site, these particles can be suctioned off effectively with a lower flow rate and/or lower velocity of the gas, and a disturbance of the surface of the applied layer of powder is avoided.

In the first embodiment, the gas nozzle 40 closest to the respective current solidification site is used as gas extraction nozzle 34, and the gas nozzle 40 opposite is used as gas inlet nozzle 32. The other two gas nozzles (positioned transversely to the gas stream) remain inactive.

Figure 5:
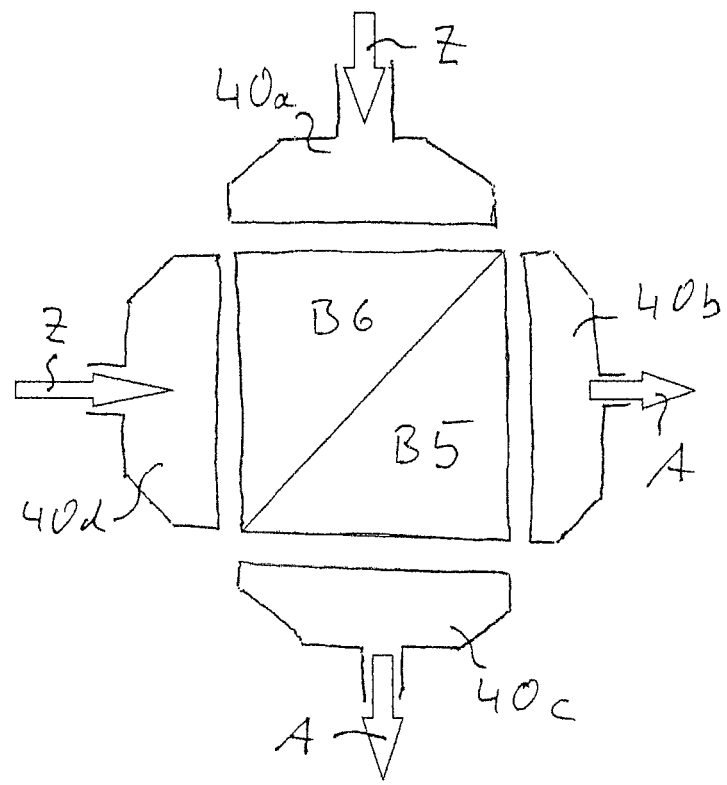
FIG. 5 is a schematic plan view of the build area shown in FIG. 2, which serves to illustrate a second variant of the inventive method.

FIG. 5 is a schematic plan view of the build area shown in FIG. 2, which is intended to explain a second variant of the method according to the invention, in which all four gas nozzles 40 are always in use.

In this embodiment, the build area is divided into two triangular areas B5-B6 by one diagonal. Here too, the gas supply and the gas extraction is controlled depending on the fact in which of these areas the current solidification site is located.

As an example, FIG. 5 shows a case in which the current solidification site is located in triangular area B5, which is adjacent to the two edges located on the right and at the bottom (in the figure) of the build area. In this case, the gas nozzles 40 that are closest to the solidification site are gas nozzles 40b and 40c. Therefore, in this case, the gas is supplied (arrow Z) through gas nozzles 40d and 40a and the gas is extracted (arrow A) through gas nozzles 40b and 40c.

A similar procedure takes place when the current solidification site is located in triangular area B6, wherein the respective gas flow directions are reversed with respect to the case described above.

Alternatively, the other diagonal of the square may also be used to subdivide the build area into two triangles.

As another alternative, no triangular areas are used, but instead the build area may be divided into four equal sub-squares, for example. Here too, the gas is supplied via the two gas nozzles 40 that border the two edges of the build area that are adjacent to the sub-square with the current solidification site, and the gas is discharged via the two opposite gas nozzles 40.

The first and second variants can also be combined with each other. Thus, for example, if the solidification site moves from the triangular area B2 shown in FIG. 2 to the triangular area B3, the gas is initially supplied (arrow Z) through gas nozzle 40d, and the gas is extracted (arrow A) through gas nozzle 40b, as shown in FIG. 3. If the solidification site approaches the boundary between regions B2 and B3, in addition, the gas supply (arrow Z) through gas nozzle 40a and gas extraction (arrow A) through gas nozzle 40c may also be switched in, so that the state shown in FIG. 5 is created. When the solidification site then enters area B3 and moves away from the boundary between the regions B2 and B3, gas nozzle 40b and 40d may be disabled, so that the state shown in FIG. 4 is achieved.

In the above embodiments, only one solidification site was considered in each state. However, there are also laser sintering systems with multi-head system, wherein the powder can be at least partly melted at several points simultaneously.

Figure 6:
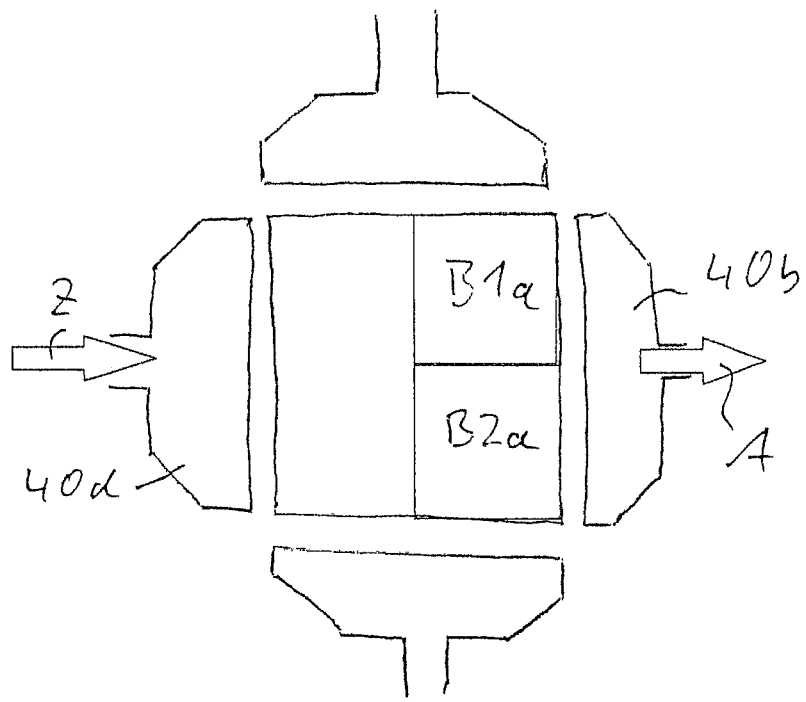
FIGS. 6 and 7 are schematic plan views of the build area shown in FIG. 2, which serve to illustrate a third variant of the inventive method.
Figure 7:
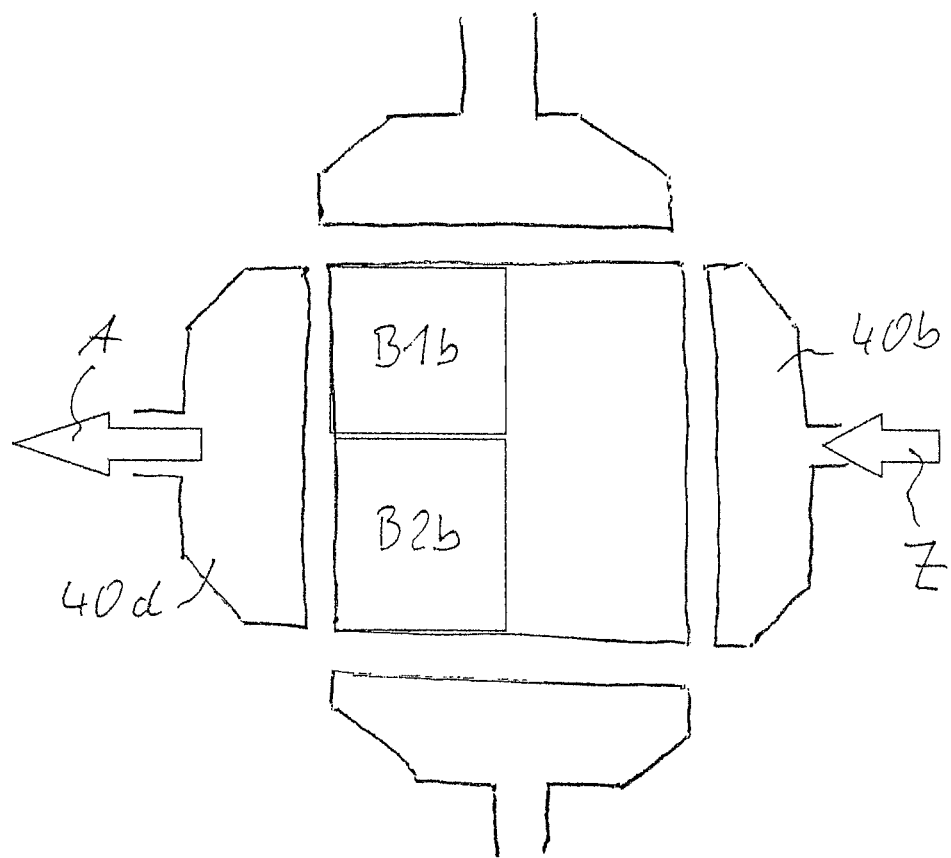

FIGS. 6 and 7 are schematic plan views of the build area shown in FIG. 2, and are intended to illustrate a third variant of the inventive method, in which a two-head system is used.

Initially, the first head solidifies the powder in area B1a of the build area shown in FIG. 6, and at the same time the second head solidifies the powder in the area in area B2a. In this case, the gas is supplied (arrow Z) through gas nozzle 40d through the gas nozzle and the gas is extracted (arrow A) through gas nozzle 40b which is closest to both areas.

Then, the first head solidifies the powder in area B1b of the build area shown in FIG. 7, and at the same time the second head solidifies the powder in are B2b. In this case, the gas is supplied (arrow Z) through gas nozzle 40b and the gas is extracted (arrow A) through gas nozzle 40d which is closest to both areas.

In all the variants described above, the gas nozzles 40 may each be designed such that the velocity of the gas stream depends on its height above the working plane.

Figure 8:
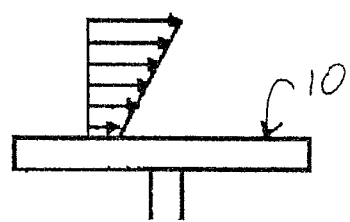
FIG. 8 is a schematic view of a velocity distribution of a gas flow above a working plane.

FIG. 8 is a schematic view of a preferred velocity distribution of a gas stream above working plane 10. Close to the powder surface, the speed is low, so that no powder is blown away or sucked away. This is particularly important when lightweight metal powders such as aluminum are used. The speed increases as height increases, i.e. perpendicularly away from the working plane, so that for example sputters can be suctioned off reliably. Such a velocity distribution may be achieved if for example the gas nozzles contain ducts arranged vertically one on top of the other that are of different designs from each other and/or are subjected to gas over-pressures or under-pressures.

Features of the various embodiments may be combined with each other where this is possible.

The gas nozzles can be controlled not only according to the position of the current solidification site, but also according to a change of position, for example, depending on whether the solidification point is approaching a boundary between two areas of the build area.

Generally, the gas nozzles may be switched as a function of any operating state of device 1. It should be noted that "operating mode" is understood to mean both the current state of device 1 and possibly the past and/or future (entirely or partly (pre-) programmed) state thereof. This means that the gas nozzles may also be switched for example, depending on what has happened before in the device or what will happen next (especially specified in the same layer to be exposed). This may be predefined, in fact stored as part of an (in particular entirely or partly pre-programmed) "irradiation strategy" for the production of the object. Besides the (programmed) sequence of solidification sites, the operating state therefore generally refers to other states within the device, such as detected flow profile irregularities in the operating workflow, and much more.

Since the impact point of the laser beam and therewith the current solidification point can be changed more quickly than the gas flow direction can be changed by switching the gas nozzles, it is advisable to direct the laser in such manner that initially all points within an area of the build area in which the same gas nozzles are used as inlet and/or extraction nozzles are solidified before sites in another area. This procedure, which was described previously in the third variant with reference to a multi-head device is also useful with a single laser head in order to avoid unnecessarily frequent switching of the gas nozzles and thus reduce the manufacturing time of an object.

Instead of four nozzles, only two nozzles may be provided, for example, on opposite sides of the build area. The gas supply and suctioning is then carried out according to the states shown in FIGS. 6 and 7 (gas nozzles 40b and 40d). However, any other number of gas nozzles may also be provided.

The build area also does not have to be square, it may for example be generally rectangular, circular, polygonal, or it may have any other shape.

The gas nozzles arranged on the sides of the build area do not have to be usable as gas inlet nozzles. It is enough if they can be switched on and off as gas extraction nozzles. The gas supply may then be assured from above, for example.

Although the present invention has been described with reference to a laser sintering or laser melting device, it is not limited to laser sintering or laser melting. It may be used for any processes for producing a three-dimensional object by applying material layer by layer and selectively solidifying a building material, in which the extraction of a gas, particularly a shielding gas is used.

The laser may comprise for example a gas or solid state laser or any other type of laser. In general, any device with which energy can be directed selectively at a layer of the building material may be used. Instead of a laser, for example, another light source, an electron beam or any other energy or radiation source that is able to solidify the building material may be used. The invention can even be applied to selective mask sintering, in which an extended light source and a mask are used, or to absorption or inhibition sintering.

Instead of introducing energy, the selective solidification of the applied building material may also be assured by 3D printing, for example by applying an adhesive. The invention relates generally to the production of an object by applying building material layer by layer and solidifying the material selectively, irrespective of the manner in which the building material is solidified.

If a powder is used as the building material, various types of powder can be used, particularly metal powder, plastic powder, ceramic powder, sand, filled or mixed powder. The protective gas used is a gas, that essentially does not react with the building material and so depends on the material used, for example preferably nitrogen for plastic powder or preferably argon and/or nitrogen for metal powder.

The invention claimed is:

1. A method for controlling the direction of gas suctioning in an apparatus for producing a three-dimensional object by selective solidification of a building material layer by layer, the apparatus comprising:
   an application device for applying a layer of the building material on a build area in a working plane;
   a solidifying device for selectively solidifying the building material in the layer;
   repeating application and solidification in consecutive layers in accordance with cross-sections of the object to be built;
   providing at least two gas nozzles that are arranged adjacent an outer boundary of the build area, the gas nozzles being spaced apart so as to generate exhaust gas flows that are concentrated across different zones of the build area and collectively cover an entirety of build area, wherein the gas nozzles are selectively switched by a controller unit into a function state for extracting gas from the build area, and into a functionless state where the gas nozzles do not extract gas; and
   switching the gas nozzles into either a function state or a functionless state depending on a site undergoing solidification,
   wherein a selected gas nozzle is selected for suctioning gas if the selected gas nozzle is a closest of the gas nozzles to the site undergoing solidification and an unselected gas nozzle is placed in a functionless state.

2. The method of claim 1, further comprising:
   switching a first gas nozzle to the function state for suctioning gas if the first gas nozzle is closer to the current solidification site than a second gas nozzle.

3. The method according to claim 1, wherein the build area is divided into predetermined areas and the gas nozzles are switched depending on which of the predetermined areas is undergoing solidification.

4. The method according to claim 1, wherein the gas nozzles are further selectively switchable into a function state for supplying gas to the apparatus so as to establish supplying nozzles, and at least one of the gas nozzles that is/are different from the one or more supplying nozzles is/are switched into the function state for supplying gas.

5. The method according to claim 1, wherein the gas nozzles are switched during the selective solidification of the layer.

6. A method for producing a three-dimensional object by applying a building material layer by layer and selectively solidifying the building material, comprising the steps of:
   a) applying a layer of the building material to a build area in a working plane;
   b) selectively solidifying the layer of the building material at sites of the layer that correspond to a cross section of the object to be produced; and
   c) repeating steps a) and b) until the object is completed,
   wherein during manufacture of the object a gas is suctioned through at least one of two gas nozzles that are arranged adjacent an outer boundary of the build area, the gas nozzles being spaced apart so as to generate exhaust gas flows that are concentrated across different zones of the build area but combined cover the entire build area;
   wherein the gas nozzles are selectively switched by a controller unit into a function state for extracting gas from the build area, and into a functionless state where the gas nozzles do not extract gas;
   wherein the gas nozzles are switched into either the function state or the functionless state depending on a site undergoing solidification; and
   wherein a selected gas nozzle is selected for suctioning gas if the selected gas nozzle is a closest of the gas nozzles to the site undergoing solidification and an unselected gas nozzle is placed in the functionless state.

7. The method according to claim 6, wherein the site undergoing solidification is controlled depending on a switching state of the gas nozzles.

8. An apparatus for producing a three-dimensional object by selective solidification of building material layer by layer, the apparatus comprising:
   an application device for applying a layer of the building material to a build area in a working plane;
   a solidifying device for selectively solidifying the building material in the layer; and
   at least two gas nozzles that are arranged adjacent an outer boundary of the build area, the gas nozzles being spaced apart so as to generate exhaust gas flows that are concentrated across different zones of the build area and collectively cover an entirety of the build area, wherein the gas nozzles can be switched into a function state for suctioning gas from the build area and into a functionless state, where the gas nozzles do not suction gas; and
   a control unit designed to switch the gas nozzles depending on a site undergoing solidification, the control unit switching gas nozzles into either the function state or the functionless state, wherein a selected gas nozzle is selected for suctioning gas if the selected gas nozzle is a closest of the gas nozzles to the site undergoing solidification, and an unselected gas nozzle is placed in the functionless state.

9. The apparatus according to claim 8, designed to control or regulate the solidifying device to define the solidification site.

10. A retrofit kit for a device for producing a three-dimensional object by selectively solidifying a building material layer by layer, wherein the retrofit kit comprises:
   at least two gas nozzles, the at least two gas nozzles adapted to be arranged adjacent an outer boundary of a build area, the gas nozzles being spaced apart so as to generate exhaust gas flows that are concentrated across different zones of the build area and collectively cover an entirety of the build area, wherein the gas nozzles can be switched into a function state for suctioning gas from the build area and into a functionless state, where the gas nozzles do not suction gas; and
   a control unit designed to switch the gas nozzles depending on a site undergoing solidification, the control unit switching gas nozzles into either the function state or the functionless state.

11. An apparatus for producing a three-dimensional object by selective solidification of a building material layer by layer, comprising:
   an application device for applying a layer of building material to a build area in a working plane;
   a solidifying device for selectively solidifying the building material in the layer; and
   at least two gas nozzles that are arranged adjacent an outer boundary of the build area, the gas nozzles being spaced apart so as to generate exhaust gas flows that are concentrated across different zones of the build area and collectively cover an entirety of the build area,
   wherein the gas nozzles are selectively switchable by a controller unit into a function state for suctioning gas out from the build area and into a functionless state, where the gas nozzles do not suction gas;
   wherein the device is designed to switch the gas nozzles into either a function state or a functionless state depending on a site undergoing solidification;
   wherein the gas nozzles are further switchable into a function state for feeding gas into the apparatus to generate a flow of gas across the build area; and
   wherein the apparatus further comprises a controller unit designed to select a selected gas nozzle for suctioning gas if the selected gas nozzle is a closest of the gas nozzles to the site undergoing solidification, and an unselected gas nozzle is placed in the functionless state, and to operate one or more gas nozzles to generate a feeding gas flow.

12. A device according to claim 11, wherein the build area in the working plane has a rectangular shape, and two gas nozzles are provided, which are respectively arranged on opposite sides of the rectangular shape.

13. The device according to claim 11, wherein the gas nozzles are each designed and/or can be actuated such that a speed of a gas stream generated by any of the gas nozzles is lowest at a level of the working plane.

14. The device according to claim 11, wherein four gas nozzles are provided, each of which is disposed on one side of the rectangular shape.

* * * * *